T. F. GARRETT.
VALVED STOPPER FOR SIPHON AND OTHER BOTTLES.
APPLICATION FILED DEC. 21, 1912.
1,074,616.
Patented Oct. 7, 1913.
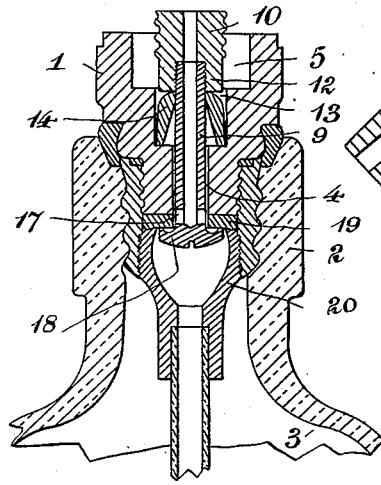
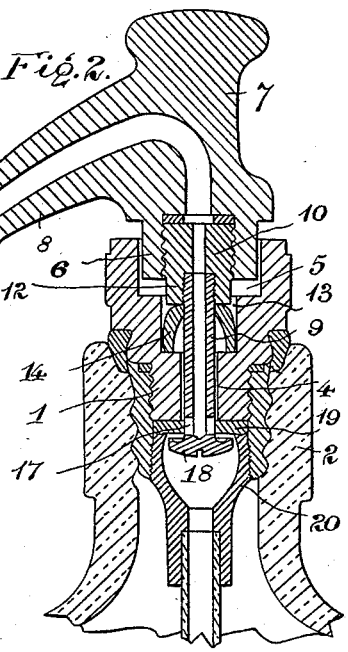
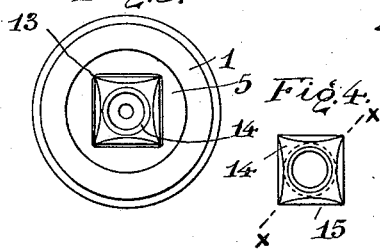
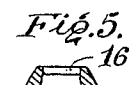
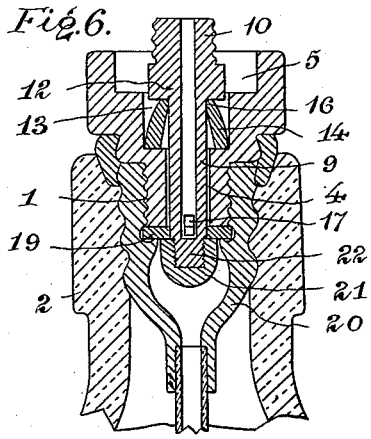

UNITED STATES PATENT OFFICE.

THEODORE FRANCIS GARRETT, OF LONDON, ENGLAND, ASSIGNOR TO CHARLES CARY-ELWES, OF ELTHAM, ENGLAND.

VALVED STOPPER FOR SIPHON AND OTHER BOTTLES.

1,074,616.

Specification of Letters Patent.

Patented Oct. 7, 1913.

Application filed December 21, 1912. Serial No. 737,951.

*To all whom it may concern:*

Be it known that I, THEODORE FRANCIS GARRETT, a subject of His Majesty the King of England, residing at 64 Kimberley avenue, Seven Kings, Essex, London, England, have invented certain new and useful Improvements in Valved Stoppers for Siphon and other Bottles, of which the following is a specification.

This invention relates to that class of stoppers for siphons and other vessels wherein the resistance to the opening of a valve is in part constituted by a resilient device, the purpose of the latter being to normally hold the valve closed and secure a fluid tight joint between the stopper and the valve plunger. The ordinary or well known organ for the foregoing double purpose is a rubber spring bridging a space between a seating on the valve plunger and a seating in the stopper, and heretofore such a rubber spring has either been of a cylindrical character surrounding the valve plunger closely from end to end and thereby preventing the freedom of action of the valve which is wanted, or it has been of a dished nature which while overcoming the clinging action between the said cylindrical rubber spring and the valve plunger which rendered the said cylindrical spring too sluggish in returning the valve to closed position after having been opened has not been formed so that a direct compression or a direct return of the organ has been obtained and the dished wall has experienced a material bending or in-folding action as distinct from the true compressive stresses of the aforesaid cylindrical type.

The object of this invention is to provide an improved form of rubber spring in which the force for returning the valve onto its seating is obtained by the reaction of direct compression of the spring, and in which there is no clinging action between the spring valve stem retarding the return movement of the valve.

The spring comprises a number of rubber pillars slightly sloped inward and tied together by thinner webs or walls of rubber which, together with the pillars, fulfil the function of definitely gripping the valve plunger at the upper part of the spring and of butting against the seating of the stopper with a close or molded surface fit in each case; the webs or walls further serving to maintain the pillars true to the line of thrust, and the spring as a whole enabling the elasticity of the rubber to be utilized by direct thrust. In this way there is obtained a direct compression of the spring followed by a direct return to the normal condition and form, and little force and movement is required to open the valve, the free action of which in closing or opening is moreover substantially unhindered by any secondary movements or strains in the rubber.

The invention being particularly applicable to valve stoppers having a spindle or plunger operated by depressing a head provided with a discharge spout, the contents of the vessel being discharged through the bore of the valve spindle and through the discharge spout it will be described in detail in that application; reference being had to the accompanying drawings, in which:—

Figure 1 is a sectional elevation of a stopper constructed according to this invention showing the valve closed. Fig. 2 is a sectional elevation the section being taken at right angles to Fig. 1. Fig. 3 is a plan view of the stopper, parts being removed to show more clearly the rubber washer. Fig. 4 is a plan view of the rubber washer detached. Fig. 5 is a section of the washer taken through $x\ x$ of Fig. 4. Fig. 6 is a modified form of stopper.

Referring to the drawings, the body of the stopper which is screwed into the neck 2 of the bottle, 3, is formed with a central bore 4 and with an annular recess 5 at its upper end, which recess is adapted to receive the lower part of the head 7 provided with the discharge spout 8. The valve spindle 9 passes through the said central bore 4 and is connected with the discharge spout head 7 by means of an intermediate piece 10 which at its upper part is externally screw threaded for connecting with said head and at its lower part 12 is of a square configuration the lower part of the bore through such intermediate piece being enlarged and screw threaded for engaging with the upper externally screwed end of the valve spindle 9. This squared end of the intermediate piece 10 is adapted to fit within a corresponding shaped depression 13 in the bottom of the aforementioned recess 5 in the body of the stopper, and within such depression between the bottom thereof and the intermediate piece 10 the improved rubber spring 14 is placed. According to a convenient form of such a ring it is at its base of a square configuration thus conforming with the shape of said depression 13, the dimensions of such ring being as follows:—Each side of square base=$\frac{1}{2}''$; height=$\frac{3}{8}''$; diameter of the bore 16 at its upper end=$\frac{5}{16}''$, the bore of this diameter extending downward for $\frac{1}{16}$ of an inch and then flaring out to a diameter of $\frac{7}{16}''$ at the bottom. The sides of the ring may be parallel or may slightly taper upward at which upper end such sides may be beveled, and at the corners the ring may be more pronouncedly rounded. When the valved stopper is assembled for use the said ring is compressed about $\frac{1}{32}$ of an inch, the screw connection between the valve spindle and the intermediate piece providing a ready means of adjustment, which adjustment may be effected by turning the head 18 of the valve spindle. The corners of the rubber spring 14 thus form rubber pillars slightly sloping inward which are tied together by the thin webs or sides of the washer. These pillars are adapted to be placed in direct compression; the webs acting to maintain the pillars true to the line of thrust when placed under compression. In such a rubber spring therefore the force for returning the valve onto its seating is obtained in virtue of the rubber being placed in direct compression by the pressure applied to the valve plunger, such force or reaction of the direct compression also further augmenting the effectiveness of the water and gas tight joint without reacting against the return movement of the valve.

Fig. 6 illustrates a modified form of the invention in which the valve spindle and intermediate part 10 are formed in one piece. The adjustment of the rubber spring 14 is effected by screwing the terminal head 21 upon screwed extension 22 of the valve spindle. This head 22 also forms the valve head.

The valve spindle is provided with slots 17 immediately above the head 18 or 22 thereof which slots form a communication between the bore of the spindle and the bottle. This head which is grooved at its upper surface so as to provide an upwardly projecting rim takes a seating upon a rubber ring 19 which is retained against the underside of the valve body by means of the siphon tube head 20 which is screwed within the body of the stopper.

Having thus described my invention, what I claim and desire to secure by Letters Patent is:—

1. The herein described rubber valve closing spring for siphon and other bottle stoppers, having a number of pillars slightly sloped inward and tied together by thinner webs or connecting walls which together with the pillars fulfil the function of definitely gripping the valve plunger at the upper part of the spring.

2. The herein described valve stopper comprising a body having a square shaped recess therein, a rubber valve closing spring, the underside of which is of a square configuration, such spring having a number of pillars slightly sloped inward and tied together by thinner webs or connecting walls which together with the pillars fulfil the function of definitely gripping the valve plunger at the upper part of the spring, and a square head upon the valve stem between which and the bottom of said recess the said spring is located.

In testimony whereof I affix my signature in presence of two witnesses.

THEODORE FRANCIS GARRETT.

Witnesses:
ALBERT GEORGE BARNES,
LEONARD COULSON.